United States Patent [19]

Sakurai et al.

[11] Patent Number: 4,578,422

[45] Date of Patent: * Mar. 25, 1986

[54] ACETAL RESIN COMPOSITION

[75] Inventors: Masanori Sakurai; Junichi Miyawaki; Toshikaju Umemura; Toshikatsu Kawata; Shinji Kiboshi, all of Toyonaka, Japan

[73] Assignee: Mitsubishi Gas Chemical Company, Inc., Tokyo, Japan

[*] Notice: The portion of the term of this patent subsequent to Mar. 19, 2002 has been disclaimed.

[21] Appl. No.: 619,145

[22] PCT Filed: Oct. 8, 1983

[86] PCT No.: PCT/JP83/00335

§ 371 Date: May 23, 1984

§ 102(e) Date: May 23, 1984

[87] PCT Pub. No.: WO84/01579

PCT Pub. Date: Apr. 26, 1984

[30] Foreign Application Priority Data

Oct. 8, 1982 [JP] Japan ................. 57-177133

[51] Int. Cl.$^4$ ............... C08K 3/72; C08K 3/34

[52] U.S. Cl. .................. 524/593; 524/105; 524/100; 524/209; 524/239

[58] Field of Search ............ 524/105, 100, 209, 239, 524/593

[56] References Cited

U.S. PATENT DOCUMENTS 4,506,053 3/1985 Sakurai et al. ............. 524/593

Primary Examiner—Maurice J. Welsh
Assistant Examiner—M. L. Moore
Attorney, Agent, or Firm—Wenderoth, Lind & Ponack

[57] ABSTRACT

This invention relates to a glass-reinforced acetal resin composition having excellent heat stability and mechanical strength. The resin composition contains both a polycyanate compound and an amino-substituted triazine and/or a cyanoguanidine compound as coupling agents. The resin composition of the invention is useful, for example, as a material for automotive parts and machine parts because of its higher mechanical strength and heat stability, especially the former, than conventional known glass-reinforced acetal resins.

12 Claims, No Drawings

ACETAL RESIN COMPOSITION

FIELD OF TECHNOLOGY

This invention relates to a novel acetal resin composition, and more specifically, to a glass-reinforced acetal resin having excellent mechanical strength and heat stability.

BACKGROUND TECHNOLOGY

It has previously been known to reinforce an acetal resin with glass fibers (see Japanese Patent Publication No. 28191/1969). Since, however, the acetal resin is chemically inert, mere mixing of the acetal resin with a reinforcing material such as glass fibers or glass powder does not produce a reinforcing effect, and in an extreme case, the mechanical strength of the resulting mixture becomes lower than the non-reinforced polyacetal resin.

To improve upon this point, methods have been proposed in which glass fibers are treated with aminosilane, vinylsilane or epoxysilane, and isocyanates, polycarbodiimide, alkoxymethylmelamines, etc. are used as coupling agents. Methods are also known to coat glass fibers themselves with a phenoxy resin, a polyamide, polyurea, polystyrene, etc. and to blend the coated glass fibers with an acetal resin.

These methods, however, have various defects in industrial practice. For example, they are expensive, the increase in mechanical strength is small, the heat stability of the resulting molding material is markedly impaired, and its toxicity is high.

Some of the present inventors previously found and proposed that the reinforcing effect of glass fibers or powder on an acetal resin can be greatly increased by incorporating a polyfunctional cyanate ester (or its prepolymer) or a mixture (or pre-reaction product) of a polyfunctional cyanate ester (or its prepolymer) and a polyfunctional maleimide (or its prepolymer) in the acetal resin (see Japanese Laid-Open Patent Publication No. 98,356/1983).

DISCLOSURE OF THE INVENTION

It is an object of this invention to provide a novel glass-reinforced acetal resin composition.

Another object of this invention is to provide a glass-reinforced acetal resin composition in which glass fibers or glass powders have excellent adhesion to the acetal resin.

Still another object of this invention is to provide a glass-reinforced resin composition having excellent mechanical strength and heat stability.

Further objects and advantages of this invention will become apparent from the following description.

According to this invention, these objects and advantages are achieved by an acetal resin composition comprising (A) an acetal resin,
(B) at least one member selected from the group consisting of
(1) a polyfunctional cyanate ester or its prepolymer,
(2) a mixture of a polyfunctional cyanate ester or its prepolymer and a polyfunctional maleimide or its prepolymer, and
(3) a prepolymer of a polyfunctional cyanate ester and a polyfunctional maleimide,
(C) an amino-substituted triazine and/or a cyanoguanidine compound, and
(D) glass fibers and/or granular or powdery glass.

The acetal resin (A) used in this invention may be a homopolymer or copolymer having oxymethylene units. Preferably, the acetal resin is composed mainly (in a proportion of at least 50 mole % based on the entire recurring units) of oxymethylene units, or substantially of oxymethylene units and oxyalkylene units having at least 2 carbon atoms (preferably 2 to 9 carbon atoms). Especially preferably, the acetal resin is composed substantially of oxymethylene units; or contains not more than 40 mole % (preferably not more than 10 mole %) of oxyalkylene units having at least 2 carbon atoms and is composed substantially of oxymethylene units and oxyalkylene units.

The acetal resin is produced, for example, from a formaldehyde monomer or a cyclic oligomer such as its trimer (trioxane) or tetramer (tetraoxane) as a starting material (in which case, an oxymethylene homopolymer composed substantially only of oxymethylene units is obtained), or from the above material and a cyclic ether such as ethylene oxide, propylene oxide, epichlorohydrin, 1,3-dioxolane, 1,3-dioxepane, a formal of a glycol and a formal of a diglycol (in which case an oxymethylene copolymer composed of oxymethylene units and units of an oxyalkylene having at least 2 carbon atoms is obtained).

Such manufacturing methods are well known in the art.

The polyfunctional cyanate ester or its prepolymer used in the composition of this invention denotes a polycyanate ester having at least two cyanate ester groups in the molecule or its prepolymer.

Preferably, the polycyanate ester is a compound represented by the following formula (1)

wherein $R_1$ represents an aromatic organic group having a valence of m, the cyanate ester groups (—O—C≡N) are directly bonded to the aromatic ring of the organic group $R_1$, and m represents an integer of at least 2.

In formula (1), m is an integer of at least 2, preferably 2 to 10. $R_1$ is an aromatic organic group having a valence of m defined above. Examples of the group $R_1$ include (a) a mononuclear or fused aromatic hydrocarbon group having 6 to 16 carbon atoms such as benzene, naphthalene, anthracene and pyrene, (b) a polynuclear aromatic hydrocarbon group resulting from direct bonding of a plurality of benzene rings typified by biphenyl, (c) a polynuclear aromatic group having a plurality of benzene rings linked to each other through a bridging member, for example a group of the following formula (5)

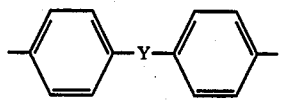

wherein Y represents a linear, branched or cyclic aliphatic hydrocarbon group having 1 to 14 carbon atoms, an aromatic hydrocarbon group typified by a phenylene or xylylene group, an oxygen atom, a sulfur atom, a carbonyl group, a sulfonyl group, a sulfinyl group, a phosphonyl group, a phosphinyl group, an imino group, or a divalent linking group such as an alkyleneoxyalkylene group, for example a group corresponding to a compound in which the skeleton represented by formula (5) above is a diphenylalkane such as diphenylmethane or 2,2-diphenylpropane, diphenyl ether, diphenyl dimethylene ether, diphenyl thioether, diphenyl ketone, diphenylamine, diphenyl sulfoxide, diphenyl sulfone, triphenyl phosphite or tripenyl phosphate, preferably the disphenylalkane, above all 2,2-diphenylpropane, and (d) a residue of a polynuclear benzene product (usually, products having 10 or less rings are preferably used), which is an initial condensation product of phenol and formaldehyde.

The aromatic ring of the organic group having a valence of m may be substituted by an inert substituent such as an alkyl group or an alkoxy group (preferably an alkyl or alkoxy group having 1 to 6 carbon atoms).

The polycyanate ester compound represented by general formula (1) is prepared generally by a known method comprising reacting the corresponding polyhydric phenolic compound with a cyanogen halide. Divalent cyanate esters derived from dihydric phenols such as 2,2-bis(4-hydroxyphenyl)propane (i.e., bisphenol A), and polyisocyanate compounds obtained by reacting an initial condensate of phenol and formaldehyde with cyanogen halides are especially preferably used because they are easily available and can give good properties to the final resin composition.

In the composition of this invention, the compound (1) in (B) may be a polycyanate ester compound, or an oligomer (prepolymer) derived from this polycyanate ester compound, or a mixture of the ester and the prepolymer. The prepolymer may be a precopolymer derived from two or more polycyanate esters.

The prepolymer can be produced by heating the polycyanate ester in the absence of a catalyst, or by polymerizing it in the presence of a catalyst such as a mineral acid, a Lewis acid, a salt (e.g., sodium carbonate or lithium chloride), or a phosphoric acid ester such as tributyl phosphine. The prepolymer has in the molecule a sym-triazine ring formed by the trimerization of the cyano groups in the cyanate ester, and preferably has a weight average molecular weight of about 400 to about 6,000. For example, a commercially available "cyanate ester resin" is a mixture of 2,2-bis(4-cyanatophenyl)propane obtained from bisphenol A and a cyanogen halide with its prepolymer, and can be conveniently used in this invention.

The polyfunctional maleimide used in the composition of the invention denotes a polymaleimide having at least two maleimide groups in the molecule.

Preferred polymaleimides are, for example, those of the following formula (2)

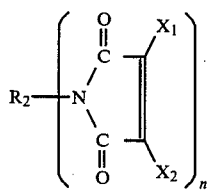

(2)

wherein $R_2$ represents an aromatic or aliphatic organic group having a valence of n, $X_1$ and $X_2$ represent a hydrogen atom, a halogen atom, or a lower alkyl group, and n represents an integer of at least 2.

In formula (2), n is an integer of at least 2, preferably 2 to 10. $R_2$ is an aromatic or aliphatic organic group having a valence of n defined above.

Examples of the organic group include (a) a linear or cyclic aliphatic hydrocarbon group having 4 to 16 carbon atoms, (b) a mononuclear or fused aromatic hydrocarbon group having a benzene or naphthalene group, such as a phenylene, naphthylene or xylylene group, (c) a polynuclear aromatic hydrocarbon group resulting from direct bonding of a plurality of benzene rings, typified by a biphenyl group, (d) a polynuclear aromatic group, represented by formula (5) given hereinabove having a plurality of benzene rings linked to each other through a bridging member, (e) a melamine residue, (f) a residue of a polynuclear benzene product obtained by reacting aniline with formaldehyde (usually with 10 or less rings). These n-valent organic groups may be substituted by inert substituents such as alkyl or alkoxy groups (preferably alkyl or alkoxy groups with 1 to 6 carbon atoms).

In the present invention, the polyfunctional maleimide may be used as a prepolymer.

The polyfunctional maleimide may generally be produced by a known method comprising reacting the corresponding polyamino compound with a maleic anhydride. Preferred polyfunctional maleimides for use in this invention are compounds of formula (2) in which $R_2$ is the polynuclear aromatic group (d) mentioned above, such as bismaleimide from 4,4'-bisaminophenylmethane and maleic anhydride.

The prepolymer of the polyfunctional maleimide may be a precopolymer derived from two or more polyfunctional maleimides.

The prepolymer may be produced by a known method, for example by heating the polyfunctional maleimide in the absence of a catalyst. Preferably, polyfunctional maleimide prepolymers having a weight average molecular weight of about 600 to about 9,000 are used in this invention.

In the present invention, the polyfunctional maleimide or its prepolymer may be used as a mixture with the polyfunctional cyanate ester or its prepolymer described above. The mixture may contain preferably not more than 90% by weight, more preferably not more than 80% by weight, based on the weight of the mixture, of the polyfunctional maleimide or its prepolymer.

A precopolymer of the polyfunctional cyanate ester and the polyfunctional maleimide may also be used as component (B) in this invention.

This coprepolymer may be produced in the same way as in the production of the polyfunctional maleimide prepolymer described above. The precopolymer may contain preferably not more than 90% by weight, more preferably not more than 80% by weight, of units derived from the polyfunctional maleimide. Preferred precopolymers have a weight average molecular weight of about 400 to about 9,000.

Preferred amino-substituted triazines for use in this invention are, for example, those represented by the following formula (3)

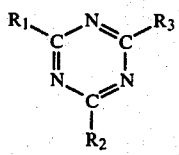 (3)

wherein $R_1$, $R_2$ and $R_3$ are identical or different, and each represents a hydrogen atom, a halogen atom, a hydroxyl group, an alkyl group, an alkoxy group, an aryl group, an arylalkyloxy group, or a substituted or unsubstituted amino group, provided that at least one of $R_1$, $R_2$ and $R_3$ is a substituted or unsubstituted amino group.

Preferred halogen atoms are, for example, chlorine and bromine, particularly chlorine.

Preferred alkyl groups are, for example, lower alkyl groups having 1 to 6 carbon atoms, particularly 1 to 4 carbon atoms.

Preferred alkoxy groups are, for example, lower alkoxy groups having 1 to 6 carbon atoms, particularly 1 to 4 carbon atoms.

A phenyl group is preferred as the aryl group, and phenylalkyloxy groups, particularly a benzyloxy or phenylethyloxy group, are preferred as the arylalkyloxy group.

Examples of the substituent on the substituted amino group include lower alkyl groups having 1 to 6 carbon atoms (such as methyl, ethyl, butyl and hexyl), a phenyl group, lower alkenyl groups having 3 to 6 carbon atoms (such as allyl and hexenyl), hydroxyalkyl groups having 1 or 2 carbon atoms (such as hydroxymethyl and hydroxyethyl), and cyanoalkyl groups having 3 to 6 carbon atoms (such as cyanoethyl and cyanobutyl).

Illustrative of the amino-substituted triazine are guanamine (i.e., 2,4-diamino-sym-triazine), melamine (i.e., 2,4,6-triamino-sym-triazine), 2,4-diamino-6-chloro-sym-triazine, N-butylmelamine, N-phenylmelamine, N,N'-diphenylmelamine, N,N-diallylmelamine, N,N',N''-triphenylmelamine, N-monomethylolmelamine, N,N'-dimethylolmelamine, N,N',N''-trimethylolmelamine, benzoguanamine (i.e., 2,4-diamino-6-phenyl-sym-triazine), 2,4-diamino-6-methyl-sym-triazine, 2,4-diamino-6-butyl-sym-triazine, 2,4-diamino-6-methoxy-sym-triazine, 2,4-diamino-6-benzyloxy-sym-triazine, 2,4-dihydroxy-6-amino-sym-triazine (i.e., amelide), 2-hydroxy-4,6-diamino-sym-triazine (i.e., ameline), and N,N,N',N'-tetracyanoethylbenzoguanamine. Of these, melamine, guanamine, benzoguanamine, N-monomethylolmelamine, N,N'-dimethylolmelamine and N,N',N''-trimethylolmelamine are especially preferred.

Preferred cyanoguanidine compounds used in this invention are, for example, those of the following formula (4)

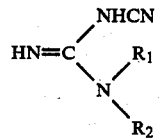 (4)

wherein $R_1$ and $R_2$ are identical or different and each represents a hydrogen atom, an alkyl group, a hydroxyalkyl group or an aryl group.

The alkyl and hydroxyalkyl groups in formula (4) have 1 to 6 carbon atoms, preferably 1 to 3 carbon atoms.

A phenyl group is preferred as the aryl group.

Examples of the cyanoguanidine compounds are cyanoguanidine, 1-cyano-3-methylguanidine, 1-cyano-3-ethylguanidine, 1-cyano-3-isopropylguanidine, 1-cyano-3,3-diphenylguanidine, 1-cyano-3-hydroxymethylguanidine and 1-cyano-3-(2-hydroxyethyl)guanidine. Cyanoguanidine is most preferred among them.

The glass fibers and granular or powdery glass used in this invention may be those which are not treated, or commercial glass fibers or granular or powdery glass treated with aminosilane or epoxysilane may also be used. The granular or powdery glass may be a glass powder, glass flakes, or glass beads.

The characteristic feature of the resin composition of this invention is that it contains the four ingredients (A) to (D).

For example, when it lacks component (B), and the amino-substituted triazine and/or the cyanoguanidine compound (C) is used as a coupling agent for the acetal resin (A) and the glass fibers or granular or powdery glass (D), the reinforcing effect is low and an increase in the mechanical strength of the resulting composition cannot be expected. However, when component (B) which is either (1) the polyfunctional cyanate ester, (2) the mixture of the polyfunctional cyanate ester and the polyfunctional maleimide, or (3) the pre-reaction product of the polyfunctional cyanate ester and the polyfunctional maleimide is used in combination with the amino-substituted trizazine and/or the cyanoguanidine compound (C) as a coupling agent for the acetal resin (A) and the glass fibers or granular or powdery glass (D), the reinforcing effect of the glass material (D) is high, and the resin composition (molding material) obtained has excellent heat stability.

According to this invention, the amounts of the coupling agents (B) and (C) for obtaining the desired mechanical strength may be smaller than in the prior art, and the reinforcing effect can be increased at lower cost.

The resin composition of this invention preferably contains 0.1 to 20 parts by weight of the compound (B), 0.1 to 20 parts by weight of the compound (C) and 5 to 70 parts by weight of the glass fibers or granular or powdery glass (D) per 100 parts by weight of the acetal resin (A).

As required, the composition of this invention may contain known heat-stabilizers, light-stabilizers, antioxidants, etc. in amounts which do not impair the effect of the present invention.

Suitable methods for producing the acetal resin composition of this invention are to melt-knead all of the components (A) to (D) at a time; or to mix two of the components (A) to (D) and then melt-knead them with the remaining components (including a method which comprises depositing at least one of components (B) and (C) on the surface of the glass fibers or granular or powder glass).

Apparatuses for melt kneading may be various extruders, and general kneading machines such as a kneader, a Banbury mixer or a mixing roll.

The suitable melt-kneading temperature is 180° to 240° C.

The acetal resin composition of this invention retains various properties such as mechanical properties, abrasion resistance and chemical resistance inherently possessed by the acetal resin, and can fully exhibit a reinforcing effect attributed to the glass fibers or granular or powdery glass.

Examples of the present invention are described below. The various properties in these examples can be determined by the following methods.

MI value: in accordance with ASTM D-1238.
Tensile strength and tensile elongation: in accordance with ASTM D-638.
Flexural strength and flexural modulus: in accordance with ASTM D-790.
Hunter color difference: in accordance with JIS Z-8722 (instrument used: Model SM-3 made by Suga Shikenki K. K.)

Best Mode of Practicing the Invention

Example 1 and Comparative Examples 1 and 2

3.0 Kg of an acetal copolymer having an MI value of 9.5 and containing 2.8% by weight of comonomer units derived from ethylene oxide (Iupital F20-01, a tradename for a product of Mitsubishi Gas-Chemical Co., Inc.), 15 g of 2,2-bis(4-cyanatophenyl)propane, 15 g of melamine and 1.0 kg of aminosilane-treated glass fibers (chopped strands) were mixed for 3 minutes by a tumbler-type blender. The mixture was fed to a single screw extruder (40 mm diameter), and kneaded and extruded at a resin temperature of 225° C.

The resulting glass fiber-incorporated acetal resin composition was injection-molded at a resin temperature of 210° C. and a mold temperature of 90° C. under an injection pressure of 800 kg/cm². The tensile strength, tensile elongation, flexural strength and flexural modulus of the molded article were measured. The results are shown in Table 1.

For comparison, melamine was not used and 2,2-bis(4-cyanatophenyl)propane was used singly; and 2,2-bis(4-cyanatophenyl)propane was not used and melamine was used singly. The results are shown in Table 1 as Comparative Examples 1 and 2.

TABLE 1

|  | Example 1 | Comparative Example 1 | Comparative Example 2 |
|---|---|---|---|
| Composition |  |  |  |
| Acetal resin (kg) | 3.0 | 3.0 | 3.0 |
| 2,2-bis(4-Cyanatophenyl)propane (g) | 15 | 15 | 0 |
| Melamine (g) | 15 | 0 | 15 |

TABLE 1-continued

|  | Example 1 | Comparative Example 1 | Comparative Example 2 |
|---|---|---|---|
| Glass fibers (kg) | 1.0 | 1.0 | 1.0 |
| Properties |  |  |  |
| Tensile strength (kg/cm²) | 1350 | 1120 | 935 |
| Tensile elongation (%) | 4 | 5 | 5 |
| Flexural strength (kg/cm²) | 1935 | 1721 | 1372 |
| Flexural modulus (kg/cm²) | 81500 | 65315 | 43210 |

Examples 2 to 5 and Comparative Example 3

In each run, a glass fiber-reinforced polyacetal resin was produced in the same way as in Example 1 except that a mixture composed of 1 part by weight of 2,2-bis(4-cyanatophenyl)propane and 1 part by weight of bismaleimide obtained from maleic anhydride and 4,4'-bisaminophenylmethane as starting materials was used as the component (B) and each of the various amino-substituted triazines or cyanoguanidines indicated in Table 2 was used as the component (C).

The tensile strength of the product is shown in Table 2.

The resulting composition was retained for 30 minutes in a heating cylinder of an injection-molding machine at a resin temperature of 220° C., and then molded into a disc having a thickness of 3 mm and a diameter of 100 mm. The Hunter color difference of the disc was examined (Table 2).

Comparative Example 3 is directed to a glass fiber-reinforced acetal resin produced by the same extrusion process as above using known diphenylmethane diisocyanate as the coupling agent. The results are also shown in Table 2.

TABLE 2

|  |  |  | Example | | | | Comparative Example |
|---|---|---|---|---|---|---|---|
|  |  |  | 2 | 3 | 4 | 5 | 3 |
| Composition | Acetal resin (kg) |  | 3.0 | 3.0 | 3.0 | 3.0 | 3.0 |
|  | Component (B) (g) |  | 20 | 15 | 20 | 20 | Diphenylmethane diisocyanate 50 |
|  | Component (C) (g) |  | Benzoguanamine 20 | N,N', N''—trimethylolmelamine 15 | Cyanoguanidine 15 | 1-Cyano-3-ethylguanidine 15 | None |
| Property | Glass fibers (kg) |  | 1.0 | 1.0 | 1.0 | 1.0 | 1.0 |
|  | Tensile strength (kg/cm²) |  | 1280 | 1315 | 1318 | 1285 | 1200 |
| Hunter color difference (discoloration under heat) | After retention in the molding machine at 220° C. for 30 minutes | L | 71.0 | 73.2 | 71.0 | 71.4 | 46.3 |
|  |  | a | −2.2 | −3.6 | −2.9 | −3.5 | 8.6 |
|  |  | b | 16.9 | 12.6 | 15.8 | 20.8 | 21.2 |

Example 6 and Comparative Example 4

A glass bead-incorporated resin composition was produced in the same way as in Example 1 except that glass beads treated with vinylsilane were used instead of the glass fibers, and 2,2-bis(4-cyanatophenyl)propane and N,N'-dimethylolmelamine were used as the coupling agent. The composition was molded and its tensile strength was examined.

For comparison, a resin composition was produced without using any coupling agent.

The results are shown in Table 3.

TABLE 3

|  | Example 6 | Comparative Example 4 |
|---|---|---|
| Composition |  |  |
| Acetal resin (kg) | 3.0 | 3.0 |
| 2,2-bis(4-Cyanato-phenyl)propane (g) | 20 | 0 |
| N,N'—dimethylol-melamine (g) | 15 | 0 |
| Glass beads (kg) | 1.0 | 1.0 |
| Property |  |  |
| Tensile strength (kg/cm²) | 625 | 419 |

Example 7 and Comparative Example 5

An acetal homopolymer (TENAC 5010, a tradename for a product of Asahi Chemical Industry, Co., Ltd.) was used instead of the acetal copolymer, and a prepolymer [component (B)] of 2 parts by weight of 2,2-bis(4-cyanatophenyl)propane and 2 parts by weight of bismaleimide obtained from 1 part by weight of maleic anhydride and 1 part by weight of 4,4'-bisaminophenylmethane and melamine [component (C)] were used as the coupling agents. The aforesaid prepolymer had a weight average molecular weight of 2,000 to 2,500 and contained in the molecule a symtriazine ring formed by the trimerization of the cyano groups in the cyanate ester.

A glass fiber-reinforced acetal resin composition was produced, and its tensile strength was examined, in the same way as in Example 1. As Comparative Example 5, the same procedure as above was repeated except that the prepolymer of 2,2-bis(4-cyanatophenyl)propane and bismaleimide was not used (melamine alone), or melamine was not used (the prepolymer alone). The results are shown in Table 4.

TABLE 4

|  | Example 7 | Comparative Example 5 | |
|---|---|---|---|
| Composition |  |  |  |
| Acetal resin (kg) | 3.0 | 3.0 | 3.0 |
| Prepolymer (g) | 35 | 35 | 0 |
| Melamine (g) | 15 | 0 | 15 |
| Glass fibers (kg) | 1.0 | 1.0 | 1.0 |
| Property |  |  |  |
| Tensile strength (kg/cm²) | 916 | 827 | 715 |

Industrial Utilizability

Since the acetal resin composition of this invention has excellent mechanical strength and heat stability as stated hereinabove, it is used widely as a material in various fields requiring mechanical strength and heat stability, for example as a material for electrical parts, automotive parts or machine parts.

What is claimed is:

1. An acetal resin composition comprising
   (A) an acetal resin,
   (B) at least one member selected from the group consisting of
   (1) a polyfunctional cyanate ester or its prepolymer,
   (2) a mixture of a polyfunctional cyanate ester or its prepolymer and a polyfunctional maleimide or its prepolymer, and
   (3) a prepolymer of a polyfunctional cyanate ester and a polyfunctional maleimide,
   (C) an amino-substituted triazine and/or a cyanoguanidine compound, and
   (D) glass fibers and/or granular or powdery glass.

2. The composition set forth in claim 1 wherein the acetal resin (A) is composed mainly of oxymethylene units.

3. The composition set forth in claim 1 wherein the acetal resin (A) is composed substantially of oxymethylene units.

4. The composition set forth in claim 1 wherein the acetal resin (A) consists substantially of oxymethylene units and units of an oxyalkylene having at least 2 carbon atoms.

5. The composition set forth in claim 1 wherein the polyfunctional cyanate ester or its prepolymer is a compound represented by the following formula (1)

wherein $R_1$ represents an aromatic organic group having a valence of m, the cyanate ester groups (—O—C≡N) are directly bonded to the aromatic ring of the organic group $R_1$, and m represents an integer of at least 2, or its prepolymer.

6. The composition set forth in claim 1 wherein the polyfunctional maleimide or its prepolymer is a compound represented by the following formula (2)

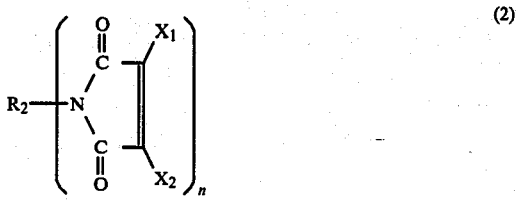

wherein $R_2$ represents an aromatic or aliphatic organic group having a valence of n, $X_1$ and $X_2$ represent a hydrogen atom, a halogen atom or a lower alkyl group, and n represents an integer of at least 2, or its prepolymer.

7. The composition set forth in claim 1 wherein the prepolymer of the polyfunctional cyanate ester and the polyfunctional maleimide is a prepolymer of the compound of formula (1) and the compound of formula (2).

8. The composition set forth in claim 1 wherein the amino-substituted triazine is a compound represented by the following formula (3)

wherein $R_1$, $R_2$ and $R_3$ are identical or different and each represents a hydrogen atom, a halogen atom, a hydroxyl group, an alkyl group, an alkoxy group, an aryl group, an arylalkyloxy group, or a substituted or unsubstituted amino group, provided that at least one of $R_1$, $R_2$ and $R_3$ is a substituted or unsubstituted amino group.

9. The composition set forth in claim 1 wherein the cyanoguanidine compound is represented by the following formula (4)

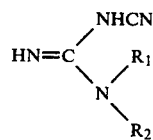

wherein $R_1$ and $R_2$ are identical or different and each represents a hydrogen atom, an alkyl group, a hydroxyalkyl group or an aryl group.

10. The composition set forth in claim 1 comprising 0.1 to 20 parts by weight of the compound (B), 0.1 to 20 parts by weight of the compound (C) and 5 to 70 parts by weight of the glass fibers and/or granular or powdery glass (D) per 100 parts by weight of the acetal resin (A).

11. The composition set forth in claim 2 wherein the acetal resin (A) is composed substantially of oxymethylene units.

12. The composition set forth in claim 2 wherein the acetal resin (A) consists substantially of oxymethylene units and units of an oxyalkylene having at least 2 carbon atoms.

* * * * *